United States Patent [19]

Kunzel

[11] 3,922,588
[45] Nov. 25, 1975

[54] DRIVE ARRANGEMENT FOR SWITCHING CLOCKS

[75] Inventor: Reiner Künzel, Schonaich, Germany

[73] Assignee: Zentra Albert Burkle Kommanditgesellschaft, Schoenaich, Germany

[22] Filed: Feb. 21, 1974

[21] Appl. No.: 444,687

[30] Foreign Application Priority Data
Feb. 26, 1973 Germany............................ 2309598

[52] U.S. Cl...................... 318/139; 307/66; 58/23 R
[51] Int. Cl.² ............................................ H02J 9/00
[58] Field of Search ........ 318/138, 139, 130; 320/4; 307/11–23, 60–66, 74–80; 58/23

[56] References Cited
UNITED STATES PATENTS

| | | | |
|---|---|---|---|
| 3,293,445 | 12/1966 | Levy .................................... | 307/66 |
| 3,302,083 | 1/1967 | Tanaka et al........................ | 318/138 |
| 3,321,688 | 5/1967 | Von Delden........................ | 318/138 |
| 3,375,423 | 3/1968 | Mayer et al........................ | 318/138 |
| 3,737,746 | 6/1973 | Cielaszyk et al................... | 318/130 |
| 3,756,010 | 9/1973 | Kimura et al....................... | 58/23 R |

*Primary Examiner*—Robert K. Schaefer
*Assistant Examiner*—John W. Redman
*Attorney, Agent, or Firm*—Edwin E. Greigg

[57] ABSTRACT

A drive arrangement for switching clocks and the like includes a synchronous motor which is connected to an A.C. power supply, which may be an ordinary A.C. power line such as is used in ordinary household circuits. The drive arrangement includes a motion reserve. The motion reserve is constituted by a chargeable storage battery, an electronic circuit which produces an alternating voltage for driving the synchronous motor, and a control circuit which is controlled by the A.C. power supply for blocking feed of the alternating voltage from the electronic circuit to the synchronous motor during periods when the A.C. power supply is functioning. The circuit controlled by the A.C. power supply allows the passage of the alternating voltage from the electronic circuit during periods of failure of the A.C. power supply.

12 Claims, 3 Drawing Figures

DRIVE ARRANGEMENT FOR SWITCHING CLOCKS

BACKGROUND OF THE INVENTION

This invention concerns a drive arrangement for switching clocks or the like which includes a synchronous motor and a motion reserve. The invention relates, more particularly, to such an arrangement in which the synchronous motor is connected to a power supply that can be connected to a power line. The motion reserve includes an automatically chargeable storage battery which can be charged directly from the power line via a charging circuit. The battery supplies an electronic switching circuit of the motion reserve which produces an alternating voltage for driving the synchronous motor during a power line failure.

The term "switching clock" designates, in the sense of the present invention, any kind of timing device which triggers switching processes in dependence on time and is driven by a synchronous motor, irrespective of whether the timing device is provided with means, such as clock hands, to provide a visible indication of the correct time in addition to its switching or signaling means which are actuated time-dependently.

In a known switching clock drive arrangement disclosed in West German Offenlegungsschrift (laid open patent application) No. 2,058,798, whenever the power line voltage fails, the base voltage of a transistor which forms part of a switching circuit producing the output alternating voltage, is charged by a storage battery inserted ahead of the switching circuit. The storage battery, which is preferably a buffer battery, is so coupled to the transistor that the transistor impedance is lowered; consequently, an electronic flip-flop circuit or an oscillator is powered by the battery, via the transistor, and an electromagnet is excited at a particular timing rythm. The electromagnet transmits driving impulses to the gear works (clock works) of the switching clock via a conventional mechanical drive mechanism. This drive mechanism of the switching clock used in the case of power line failure requires expensive mechanical members in order to transmit the drive impulses of the electromagnet to the gear works of the switching clock and to decouple the synchronous motor from that group of the gear works which is actuated by the electromagnet during power line failures. In addition, the frequency of the flip-flop or of the oscillator must be very low in order to assure that its output power be not so large as to deplete rapidly the storage battery. Such low frequencies can be produced, however, with sufficient accuracy only by constructionally expensive techniques and, if no great effort is expended, then considerable inaccuracies of the timing of the switching clock may occur during periods when the switching clock is powered from the motion reserve.

In the introduction to the specification of the West German Offenlegungsschrift No. 2,058,798, a state of the art is described, furthermore, according to which a battery is provided for a motion reserve, this battery driving a synchronous motor after the failure of the power line. The battery drives the synchronous motor by means of an electronic circuit, not further described, which transforms the available D.C. current into an A.C. current, but this is possible only for a short period, i.e., the duration of the motion reserve is very sharply limited.

SUMMARY OF THE INVENTION

It is an object of the present invention to provide a drive arrangement for switching clocks which is free of expensive mechanical members.

It is another object of the present invention to provide a drive arrangement for switching clocks which is free of members which decouple its synchronous motor from part of its gear works during power line failures.

It is an additional object of the present invention to provide a drive arrangement for switching clocks which is both accurate and relatively inexpensive.

It is a further object of the present invention to provide a drive arrangement for switching clocks which does not undesirably discharge its battery during a short period upon failure of the power line.

The foregoing objects, as well as others which are to become apparent from the text below, are achieved by providing a drive arrangement for switching clocks and the like which includes, in combination: a synchronous motor, means for connecting the synchronous motor to an A.C. power supply and a motion reserve. The motion reserve includes a chargeable storage battery and means for charging it from the A.C. power supply, an electronic circuit and control circuit means. The electronic circuit means is supplied with power from the storage battery for producing an alternating voltage for driving the synchronous motor during periods of failure of the A.C. power supply. The electronic circuit is coupled to the synchronous motor and produces its alternating voltage at least during periods of A.C. power supply failure. The control circuit which is coupled to the A.C. power supply and is responsive to its voltage, is arranged to prevent appearance of the alternating voltage from the electronic circuit at its output to the synchronous motor during periods of A.C. power supply functioning and to allow appearance of the alternating voltage from the electronic circuit at its output to the synchronous motor during periods of A.C. power supply failure.

It is a feature of the present invention in some possible embodiments that the electronic switching circuit is constantly coupled to the windings of the synchronous motor during both modes of operation of the switching clock, i.e., during periods of driving the synchronous motor from the power line or from the motion reserve. The input of the electronic switching circuit is constantly coupled to the battery. The switching circuit active components influenced by the power line voltage, prevent the appearance of the output alternating voltage from the motion reserve whenever the switching clock is supplied with voltage from the power line.

This embodiment, according to the present invention, achieves numerous advantages, among them the following:

Because the input of the electronic switching circuit of the motion reserve is always coupled to the storage battery and the output is always coupled to the windings of the synchronous motor, switching transistors or the like, in the lines to and from this switching circuit, are unnecessary.

Voltage drops which always occur across such switching transistors would have to be compensated for by a correspondingly higher storage battery voltage. Consequently, the battery would be more expensive in construction. Furthermore, it is practically impossible to provide a single cell battery for driving the synchronous motor as a motion reserve unless a voltage multiplier is also provided. The present invention, on the other hand, creates especially the preferentially provided possibility that a single cell storage battery, preferably embodied as a nickel cadmium battery, can be used without disadvantage. The battery can suitably have sintered electrodes. In this way, the constructional expense for the battery is minimal. Thus, considerable cost savings and space savings are realized.

It is preferentially provided that the electronic switching circuit of the motion reserve does not require and does not have voltage multiplying means (voltage multipliers), i.e., all of the required components of the electronic switching circuit needing supply voltage are directly fed by the storage battery during periods of motion reserve drive.

The output voltages of particularly suitable single cell batteries are, as a rule, approximately from 1.1 volts to 1.3 volts. In the preferentially provided utilization of nickel cadmium batteries, it is further insured that near complete discharges of the battery over a long period of time do not adversely affect the lifetime of the battery. Storage and shipping do not present problems. By using a synchronous motor of low power, it is quite possible to provide running times of the motion reserve of at least several hours, which correspond to the usual requirements, even when using commercial gas-tight batteries of approximately 0.5 ampere-hours. Preferably, synchronous motors of a power input of less than 0.1 watt are used. In particular, synchronous motors requiring power inputs of approximately from 30 milliwatts to 80 milliwatts and suitably a nominal operating voltage of less than 1 volt, preferably approximately 0.5 volt, may be used. A synchronous motor of this type, can for example, have the following characteristics:

| Nominal voltage: | | 0.5 volt RMS |
|---|---|---|
| Power input: | approximately | 50 milliwatts |
| Torque: | " | 0.5 pcm |
| Nominal rpm: | | 375 rpm |

If the constructional cost of a voltage multiplier is acceptable, then synchronous motors can be provided whose nominal voltages are larger or even substantially larger than the supply voltage of the battery.

It is to be understood that, when the solution according to the invention is employed, attention must be given to the switching technique adopted to avoid the disturbing influence of the power line voltage during power line operation on the electronics of the motion reserve so that electronic components will not be damaged or destroyed. This can be achieved, for example, suitably, by an appropriately dimensioned voltage divider circuit connected to the power line voltage, or the power line voltage can be transformed to low voltages.

Furthermore, the circuit can be suitably so designed, for example, so dimensioned, that its degree of effectiveness is not disturbingly reduced by a low impedance loading of the power line during motion reserve operation. This also can be achieved, for example, by using the previously mentioned voltage divider or by other suitable measures, for example, by using zener diodes.

A further advantage is that the timing clock does not fail completely if the electronic circuit of the motion reserve should become defective, because the power line operation of the switching clock can be continued for as long a time as desired, even when one or more parts of the electronic circuit are defective.

DETAILED DESCRIPTION OF THE PREFERRED EMBODIMENTS

Figure 1:
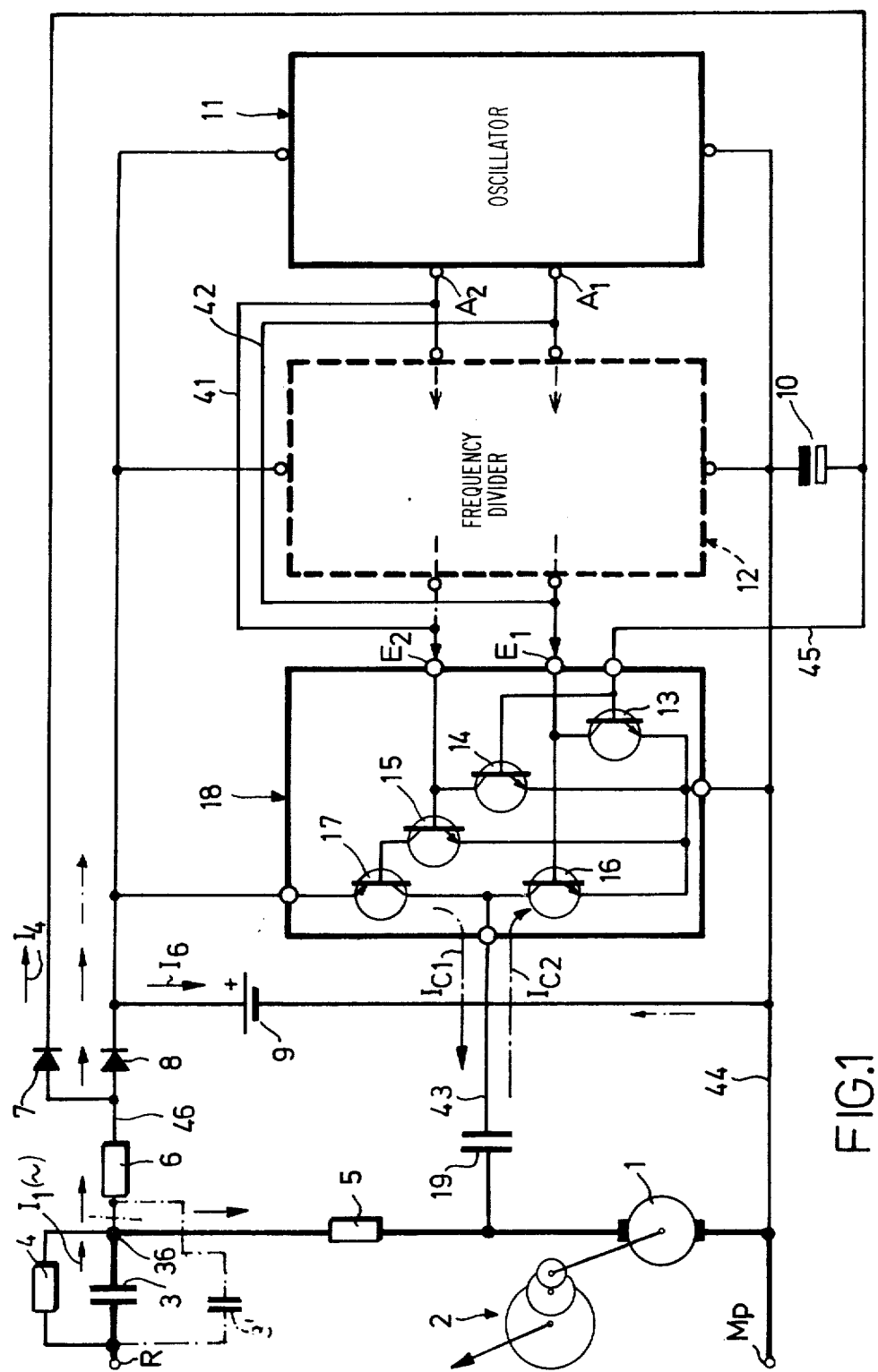
FIG. 1 is a schematic diagram of a drive arrangement for switching clocks, according to a first, illustrative, exemplary embodiment of the present invention, which includes a synchronous motor, the switching clock being diagrammatically illustrated.

The exemplary embodiments of the invention depicted in the drawing are tested and proven embodimental forms. Thus, the schematic details pertaining to particular embodimental forms, which are visible in the drawing, and suitable even if not particularly described in detail in the following text.

The full line arrows in the drawing show the flow of current during operation from a power line. The broken line arrows illustrate operation from the motion reserve.

As shown in FIG. 1, a drive arrangement for a switching clock or the like includes a miniature synchronous motor 1 of the switching clock, which switches contacts, commutators or the like (not shown) for switching current circuits (not shown) on and off. The switching on and off is achieved by conventional gear works (clock works) 2 shown diagrammatically. The switching clock can be any switching clock whatever which preferentially serves for the daily and/or weekly and/or monthly switching of a switching process, for example, in connection with heating systems, air conditioning systems, alarm systems, and so on.

The input terminals R and M$p$ of the circuit can be supplied with a power line alternating voltage of, for example, 220 volts. The synchronous motor 1 in this preferred, exemplary embodiment can particularly suitably have a power input, for example, of approximately 50 milliwatts and a nominal voltage of approximately 0.5 volt. Its output torque suffices for driving the gear works 2 of the switching clock.

During power line operation, the circuit is supplied directly from the 220 volt power line. The normal frequency is consequently the usual power line frequency, for example, 60 Hz in the United States and 50 Hz in Europe. In order to minimize losses and hence the heating of the entire circuit, a capacitor 3 is inserted in a line connected to the input terminal R and serves as a current limiting A.C. impedance. The value of the capacitor 3 depends on the required current $I_1$. The capacitor 3 is shunted by a resistor 4 of high ohmic value, which is provided for reasons of safety in order to discharge the capacitor 3 if the circuit must be disconnected from the power line, for example, for purposes of repair. One terminal of the synchronous motor 1 is connected directly to the A.C. input terminal M$p$, its other input terminal being connected, via a resistor 5, to the junction between the capacitor 3 and the resistor 4.

The effective nominal voltage of approximately 0.5 volt for the synchronous motor 1 derives from the ratio of the A.C. impedance of the capacitor 3 considered with the resistor 5 to the A.C. impedance of the windings of the motor 1. In this exemplary embodiment, the total voltage drop across the resistor 5 and across the windings of the motor 1 cannot suitably be larger than is required for charging of a storage battery 9.

In order to ensure maximum decoupling during motion reserve operation and so as not to reduce the degree of effectiveness of the motion reserve by a low impedance load on the power line, it is suitable to dimension the circuit in such a way that the sum of the apparent impedance of the capacitor 3 and of the resistor 5 is substantially larger than the apparent resistance of the windings of the motor 1. The storage battery 9 in the circuit, according to the invention, can be a single cell battery. The battery 9 is preferably a nickel cadmium battery. During power line operation, the battery 9 is supplied with a charging current $I_6$ in buffer operation via a series connected resistor 6 and a rectifier 8. The magnitude of the charging current $I_6$ is picked so that the storage battery 9 can be fully charged from the power line current and remains fully charged as long as the power line does not fail. The terminals of the storage battery 9 are always connected to the electronic circuits of the motion reserve and to the motor 1 as shown, in a conductive, resistance-free manner.

The electronic circuits of the motion reserve include an oscillator 11, shown as a block, and an output stage 18 serving as a switching and amplifying stage. If the time accuracy demands made on the motion reserve are not too high, then the oscillator can be, for example, a multivibrator oscillating at the same frequency as the frequency of the power line (60 Hz in the United States; 50 Hz in Europe). The multivibrator has substantially equal turn-on and turn-off periods of time. Its outputs A1 and A2, where A2 is equal to $\overline{A1}$, carry signals of opposite phase which directly control the output stage 18, via connecting lines 41 and 42, and the inputs E1 and E2 of the output stage 18.

If, on the other hand, an oscillator 11 is employed whose output frequency is higher than the frequency of the power line, for example, a quartz oscillator, the two connecting lines 41 and 42 are eliminated and the outputs A1 and A2, from the oscillator 11, are connected to the inputs of a conventional frequency divider 12, shown as a dashed-line block, at whose two outputs signals, having a frequency of 50 Hz or 60 Hz, as the case may be, of opposite phase occur. The opposite phase signals from the frequency divider 12 are fed respectively to the inputs E1 and E2 of output stage 18. Thus, the frequency divider 12 controls the output stage 18. It is particularly suitable to construct the oscillator 11 as a quartz oscillator.

Switching transistors 16 and 17, which operate as push-pull class B amplifiers, constitute the output circuit components of the output stage 18. In the place of the customary disposition of emitter followers, the transistors 16 and 17 are connected as emitter amplifiers, i.e., their collectors are conductively connected to each other. This has the advantage that the voltage available from the single cell battery 9 of approximately 1.1 to 1.3 V is sufficient for driving the transistors 16 and 17 into saturation, without the need for voltage multiplication. A driver transistor 15, which drives the transistor 17, serves to shift the level of the signal to the transistor 17.

The power supply inputs to the oscillator 11, the output stage 18 and also the frequency divider 12, if present, are directly conductively connected to the two terminals of the storage battery 9, i.e., without intervening switching circuit components connected in series with the storage battery because the supply voltage of the single cell storage battery 9 is sufficient for supplying the assemblies 11, 12 and 18. The output voltage occurring on the output line 43 of the output stage 18, which voltage supplies the synchronous motor 1 during a power line failure, can have the required nominal voltage of 0.5 volt without the insertion of any voltage multiplier, because all components of the switching circuit of the motion reserve requiring supply voltage are connected directly to the storage battery 9, and the output of the output stage 18 is coupled directly to the motor 1 without the intervening presence of switching transistors; consequently, no voltage drop occurs. The output line 43, which includes a series connected capacitor 19, is connected to the connecting line between the resistor 5 and the synchronous motor 1. The other end of the motor winding is connected to a line 44. One terminal of the storage battery 9 is directly conductively connected to the line 44 which is connected to the input terminal Mp of the power line.

In order to ensure that no output A.C. signal occurs at the output of the output stage 18 during power line operation, the output stage 18 has transistors 13 and 14, whose base connections are tied to a line 45 which, in turn, is connected to the line 46 via a series connected rectifier 7. The line 46 is supplied by the power line, via the resistor 6 and the capacitor 3. The charging rectifier 8 is also connected to the resistor 6. The emitters of the transistors 13 and 14 are connected to the line 44. The collector of the transistor 14 is connected to the base of the driver transistor 15 and the collector of the transistor 13 is connected to the base of the transistor 16. Furthermore, the base of the transistor 15 is connected to the input E2, and the base of the transistor 16 is connected to the input E1 of the output stage 18.

During power line operation, the transistors 13 and 14 so influence the potentials of the control connections to the inputs E1 and E2, that the transistors 16 and 17 are blocked, so that the motion reserve does not influence the power line operation. The signal for this blocking (decoupling) is supplied by a current $I_4$ from the rectifier 7 which charges a capacitor 10 connected between the lines 44 and 45. The current $I_4$ is present only during power line operation. The positive power line half wave reaches the base of transistors 13 and 14 through the rectifier 7 and the line 45. The collector potentials of the transistors 13 and 14 become negative so that the transistors 15, 16 and 17 are blocked independently of the input signals present at the inputs E1 and E2 of output stage 18. During the negative half wave, the transistor 13 or 14 is affected by the capacitor 10, previously charged by the positive half wave. An undesirable reversely acting turn-on of the transistors 13 and 14 during motion reserve operation, caused by the voltage drop at the synchronous motor 1, is not possible because of the threshold voltage of the rectifier 7 which must be overcome and because of the internal base-emitter current paths of the transistors 13 and 14, which act as diodes.

During power line failure, the transistors 13 and 14 are blocked, therefore their collector-emitter paths have high effective resistances. Thus, these transistors 13 and 14 cannot influence the output voltage of the motion reserve.

When the input signal at the input E2 is positive, the transistor 15 conducts and its collector potential changes toward negative values. Because of that, the transistor 17 also becomes conductive, resulting in a current $I_{c1}$ going from the positive pole of storage battery 9 through the transistor 17, the capacitor 19 and the synchronous motor 1. If a frequency of 50 Hz is assumed, the capacitor 19 is charged in a time of 10 milliseconds (half periods). When the input E1 of the output stage 18 becomes positive at the beginning of the next half cycle, the transistor 16 becomes conducting and the charge previously stored in the capacitor 19 supplies a current $I_{c2}$ which flows in the line 43 in the opposite direction to the current $I_{c1}$. As a consequence, the direction of the current in the synchronous motor 1 is also changed at the predetermined frequency of 50 Hz and the motor runs at its nominal rpm.

The magnitude of the voltage for the synchronous motor 1 during motion reserve operation is determined by the transistors 16 and 17. It is therefore suitable to utilize transistors requiring a low collector-emitter voltage or to use them inverted (collector-emitter interchanged). Because of the lower power requirements of the motor 1, the storage battery 9 can be one having a small energy capacity. Such a battery can drive the motor 1 through the electronic switching circuit of the motion reserve for several hours during a failure of the power line voltage, which is virtually always sufficient for motion reserve operation since a power line failure normally lasts at most a few hours. Furthermore, instead of the customary disposition of the push-pull output stage as an emitter follower circuit, a circuit configuration as an emitter amplifier has been chosen (both collectors connected) in order to make possible a control of the transistors 16 and 17. The voltage drop over the collector-emitter path is only a few millivolts, in this case.

As soon as the power line failure is terminated, the current $I_4$ opens the transistors 13 and 14 again and they prevent the occurrence of an output A.C. voltage on line 43.

Figure 2:
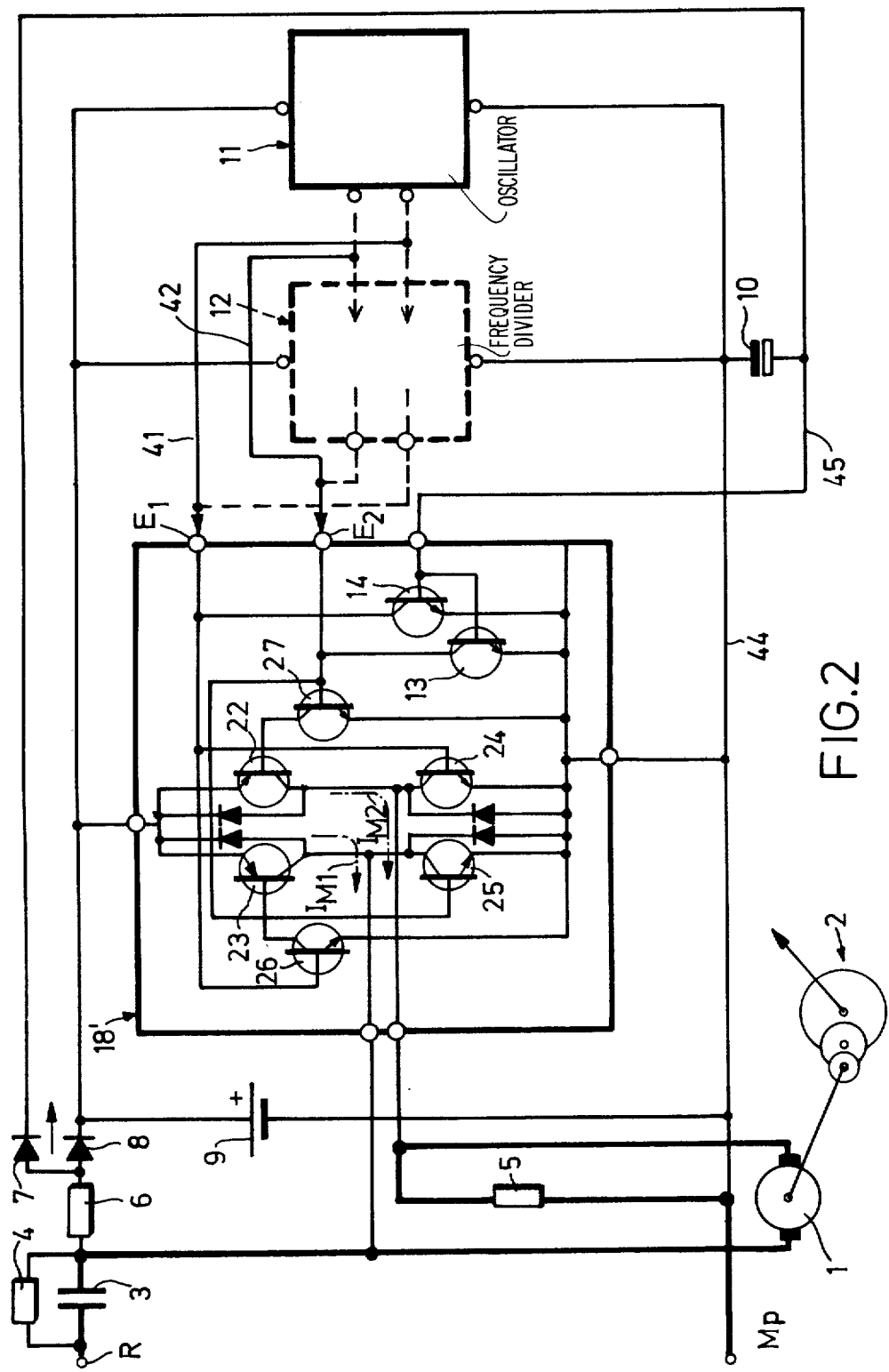
FIG. 2 is a schematic diagram of a drive arrangement for switching clocks according to a second, illustrative, exemplary embodiment of the present invention.
Figure 3:
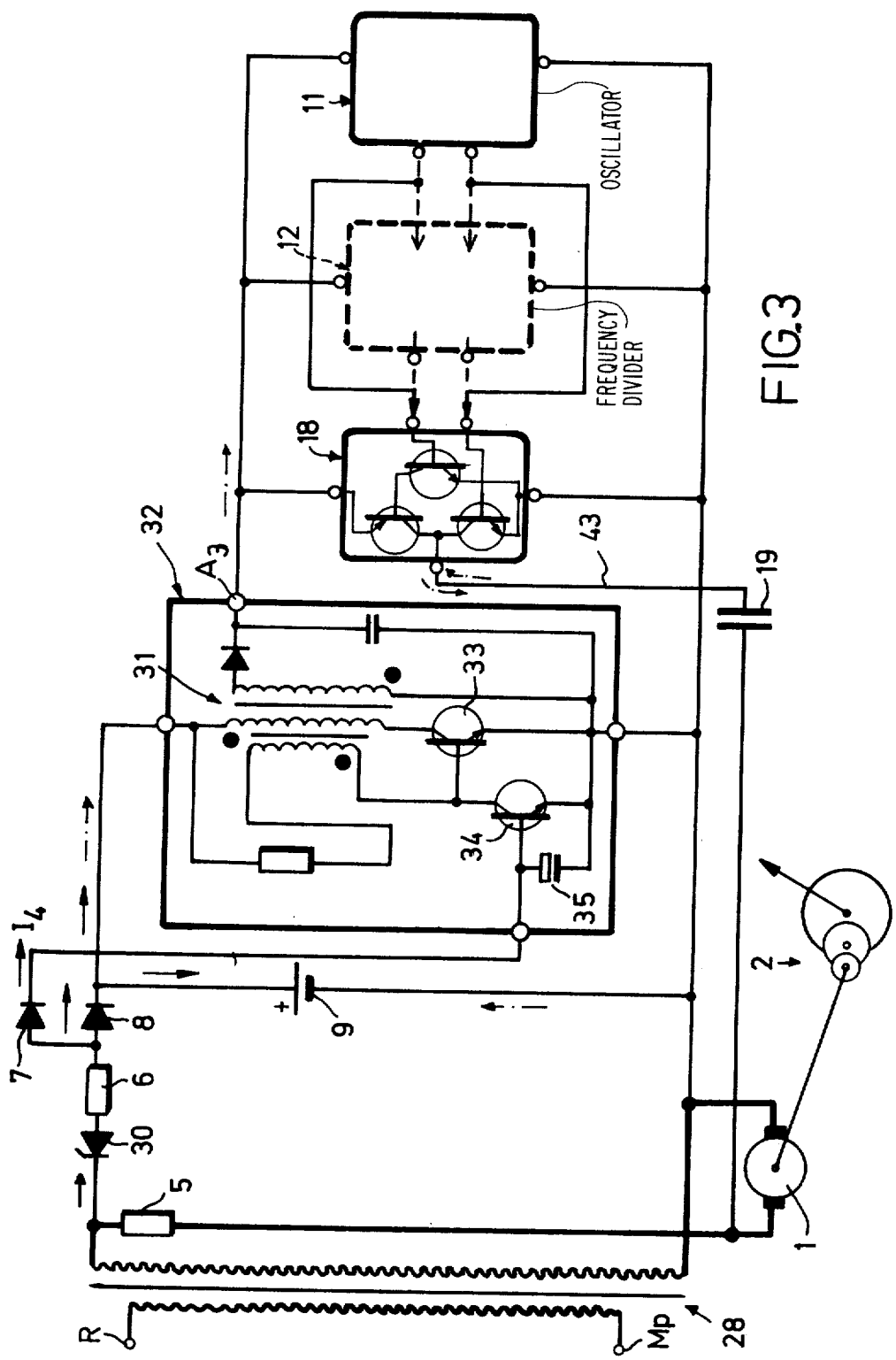
FIG. 3 is a schematic diagram of a drive arrangement for switching clocks according to a third, illustrative, exemplary embodiment of the present invention.

Parts of FIGS. 2 and 3, which correspond to those of FIG. 1, have the same reference numerals.

The control of the synchronous motor 1 by the output stage 18 of the electronic switching circuit of the motion reserve can occur without capacitor 19 (FIG. 1). The capacitor 19 may be omitted for reasons of cost economy and space economy. An advantageous drive arrangement of this kind is shown in FIG. 2. The construction and function correspond substantially to the described embodiment of FIG. 1. Consequently, the description of the circuit of FIG. 2 has been made short, reference being made only to the most important differences with respect to the arrangement shown in FIG. 1.

In the case of FIG. 2, the windings of the synchronous motor 1 are connected diagonally across a bridge circuit consisting of four transistors 22, 23, 24 and 25 forming part of a switching and amplifying output stage 18', which is also the output stage of the electronic circuit of the motion reserve. Two transistors 26 and 27 are the driver stages and serve for shifting respectively the signals applied to the respective bases of the transistors 23 and 22. The base of the transistor 26 is connected to the control input E1 and the base of the transistor 27 is connected to the control input E2 of the output stage 18'. As in the case of FIG. 1, the transistors 13 and 14 form the switching components which prevent the occurrence of an output A.C. voltage from the output stage 18' during power line operation. The collectors of the transistors 13 and 14 are therefore connected to the supply line leading to the bases of transistors 27 and 25 or 26 and 24, and their bases and emitters are connected in the same configuration as in the case of the arrangement shown in FIG. 1, so that the transistors 13 and 14 do not have a voltage reducing effect on the ouput A.C. voltage from the motion reserve. Consequently, it is possible to use, in this case, a single cell storage battery 9 as in the arrangement of FIG. 1, when the motor 1 has a nominal voltage of approximately 0.5 volt. The transistors 13 and 14 block the output stage 18' during power line operation in the same manner as in the case of FIG. 1, i.e., they provide such negative potentials during power line operation to the conductors of stage 18' connected to their collectors, that the 180° phase-shifted 60 Hz or 50 Hz-control signals, as the case may be, which reach the inputs E1 and E2, even during power line operation, cannot unblock the transistors 22 to 27.

If desired, the oscillator 11 may be arrested during power line operation, instead of blocking the output stage 18 or 18'.

If the power line fails, the transistors 13 and 14 are permanently blocked. During a positive input signal at input E1, the transistor 24 conducts and so does the transistor 23 because of the transistor 26. In this way there results a current flow $I_{M1}$ from the positive terminal of the storage battery 9 through the transistor 23, the synchronous motor 1, and the transistor 24 to the other terminal of storage battery 9. During the subsequent half cycle of the control voltage, the input E1 is negative or zero. The transistors 23 and 24 are then blocked. During this half cycle, however, the control signal at the input E2 is positive. As a consequence, the transistors 22, 25 and 27 are open and conduct and a current $I_{M2}$ flows through the windings of the synchronous motor 1 in the opposite direction of the previous current $I_{M1}$. The current $I_{M2}$ flows from the positive terminal of the storage battery 9 through the transistor 22, the windings of the synchronous motor 1 and the transistor 25 to the other terminal of the storage battery 9. In this way the synchronous motor 1 is driven by the switching system of motion reserve at its nominal rpm during power line failure.

Connected parallel to the transistors 22, 23, 24 and 25 are silicon diodes so that the inductive energy, created during the permutation of the motor 1, can be conducted away. These diodes are not necessary if the motor 1 has relatively low inductive reactance.

So as not to reduce the degree of efficiency of the illustrated motion reserve, it is suitable to make the resistor 5 substantially larger than the A.C. impedance of the motor windings of the motor 1, which is easily possible as can be seen from the schematic diagram.

In all figures, the line which carries current supplying the motor 1 during power line operation, is shown by lines which are thicker than the other lines, for the purpose of clarity.

The circuits of FIGS. 1 and 2, when using a single cell storage battery 9 whose supply voltage is approximately from about 1.1 volts to about 1.3 volts, require that the nominal voltage of the synchronous motor 1 is smaller than or approximately equal to 0.5 volt. If it is desired to use synchronous motors with higher nominal voltage, then one must use several battery cells in series or one must produce the required higher operating voltage of the motion reserve with conventional voltage multiplying circuits. For reasons of cost and space economy, blocking oscillators or the like are particularly suitable for voltage multiplication.

A circuit which is suitable for the motion reserve operation of a synchronous motor whose nominal voltage is so high that a voltage multiplier is required for the motion reserve is shown in FIG. 3. The synchronous motor can, for example, have the following characteristics:

| | |
|---|---|
| Nominal Voltage: | 3 volts RMS |
| Power input: | 35 milliwatts |
| Torque: | 0.5 pcm |
| Nominal rpm: | 375 rpm |

Obviously, other synchronous motors having different characteristics can be used, if desired.

Because the circuit of FIG. 3 is similar in structure or operation, in many respects, to that of FIG. 1, only the substantial differences with respect to FIG. 1 will be described further in detail. A voltage multiplier embodied as a blocking circuit, shown schematically as block 32, delivers at its output A3 a voltage of such magnitude that a voltage of sufficient magnitude for driving the synchronous motor 1 by means of the motion reserve occurs at the output of output stage 18 which corresponds to the output stage 18 of FIG. 1 without the transistors 13 and 14. The output voltage of the blocking circuit 32 is derived from an output secondary of a transformer which is part of a blocking oscillator 31. The oscillator 11 and, if it is present, also the frequency divider 12 is also supplied with operating voltage from the output secondary winding of the blocking oscillator 31, a rectifier being connected between the output secondary and each of the output stage 18 and the oscillator 11 and, if present, the frequency divider 12.

In this exemplary embodiment, the switching means for preventing an output A.C. voltage of the line 43 during power line operation are advantageously not built into the output stage 18 but rather into the blocking circuit 32. It could, however, also be placed in the output stage 18 or into the oscillator 11 or the frequency divider 12. As a consequence, in the specific one of these exemplary embodiments, shown in FIG. 3, the blocking oscillator 31 oscillates only during motion reserve operation and not during power line operation.

During power line operation, a holding current $I_4$ prevents the production of a voltage in the blocking circuit 32 in that the positive half wave of the secondary voltage of an A.C. input step-up power transformer 28, whose primary is connected to the power line, reaches the base of a transistor 34 through a zener diode 30, a resistor 6 and a rectifier 7. The collector potential of transistor 34 becomes negative and thus blocks the transistor 33 of the blocking oscillator 31. During the negative half wave, the transistor 34 is controlled by a capacitor 35 previously charged by the positive half wave and so the transistor 33 remains blocked. When the power line voltage fails, the blocking oscillator 31 is unblocked and the oscillator 11 is excited so that an A.C. current which keeps the synchronous motor 1 in operation occurs at the output of the output stage 18 on the line 43.

An unintentional reversely acting opening of the transistor 34 during motion reserve operation is not possible because of the threshold voltage characteristic of the zener diode 30.

The use of the step-up transformer 28 is not required in principle, but rather it is shown to indicate that a simple modification results in eliminating the need for the capacitor 3 and the discharge resistor 4, which are provided in the exemplary embodiments of FIGS. 1 and 2. This can be necessary, if a conductive isolation is required from the 220 V supply line.

It is to be understood that the invention could be embodied in numerous further embodimental forms. Even the shown exemplary embodiments leave the possibility of numerous changes. For example, even though it is generally particularly advantageous if the oscillator delivers two output voltages in opposite phase as is shown in the exemplary embodiments, it can nevertheless be provided, in many cases, that the oscillator delivers a single oscillating voltage which can supply the synchronous motor during motion reserve operation either directly or intermediately through at least one amplifier and/or a switching stage.

FIG. 1 shows an advantageous variant of the input circuit in dotted lines in which the resistor 6 is disconnected from circuit point 36 and is connected to the input terminal R through a capacitor 3'.

Among other things this has the advantage that a voltage drop across the voltage divider-resistor 5 and the apparent resistance of the motor windings of the motor 1 can be made substantially smaller, because this voltage drop no longer serves as the charging voltage for the storage battery 9. In this variation, the resistor 5 serves only as a protective resistance and can have a low value. The power input and therefore the heating of the entire circuit can therefore be reduced to a minimum. In addition, an additional decoupling is given as between power line operation and motion reserve operation.

What is claimed is:

1. A drive arrangement for switching clocks and the like comprising, in combination:
   a. a synchronous motor having windings;
   b. means for connecting said synchronous motor to an A.C. power supply means; and
   c. motion reserve means including
      1. a chargeable storage battery and means for charging same from said A.C. power supply means;
      2. electronic circuit means, including oscillator means and supplied with power from said storage battery for producing at its output an alternating voltage to drive said synchronous motor during periods of failure of said A.C. power supply means, permanently and non-inductively coupled to the windings of said synchronous motor; and
      3. control circuit means controllably coupled to said A.C. power supply means and including at least one first transistor controlled by a control voltage derived from said A.C. power supply means, and including at least one further transistor coupled to said first transistor and responsive to its output which blocks said further transistor whenever voltage from said A.C. power supply means is present; whereby said control circuit means is responsive to the A.C. power supply voltage and prevents appearance at said output of said electronic circuit means of said alternating voltage during periods said A.C. power supply means functions and allows appearance of the alternating voltage at said output of said electronic circuit means during periods said A.C. power supply fails.

2. A drive arrangement according to claim 1, wherein said storage battery is a single cell battery.

3. A drive arrangement according to claim 1, wherein said synchronous motor has a nominal input voltage rating of less than 1 volt.

4. A drive arrangement according to claim 3, wherein said synchronous motor has a nominal input voltage rating of less than 0.5 volt.

5. A drive arrangement according to claim 1, including capacitive coupling means connected between said output of said electronic circuit means and said synchronous motor.

6. A drive arrangement according to claim 1, wherein said electronic circuit means includes an oscillator means having two outputs of opposite phase, the frequency of said oscillator means being related to that of said A.C. power supply means so that said synchronous motor operates at substantially the same speed in either operating mode.

7. A drive arrangement according to claim 6, wherein said electronic circuit means include an output stage having at least one pair of transistors coupled to said two outputs of opposite phase from said oscillator means and responsive thereto, and wherein the collectors of said pair of transistors are connected together and their respective emitters are connected to circuit points of respective fixed potentials.

8. A drive arrangement according to claim 1, wherein said electronic circuit means includes an oscillator means which oscillates continuously during operation of the switching clock.

9. A drive arrangement according to claim 1, wherein said electronic circuit means includes an output stage having two terminals, and further including a voltage divider means constituted by a resistor and windings of said synchronous motor, said storage battery being connected in parallel with said voltage divider; a current limiting circuit component connecting one end of said voltage divider to one terminal of said A.C. power supply means; and a capacitor, said capacitor being connected between one of said two terminals of said electronic circuit means and a junction point between said resistor and a first connection to said windings of said synchronous motor, and the other of said two terminals of said output stage being connected to a second connection to said windings of said synchronous motor.

10. A drive arrangement according to claim 9, additionally including a further resistor and wherein said current limiting component is a further capacitor, said further resistor being connected in parallel with said further capacitor for discharging it.

11. A drive arrangement according to claim 1, further including a series circuit formed by a rectifier, an ohmic resistance and a capacitor connected in series, one terminal of said storage battery being connected to one terminal of said series circuit, and the other terminal of said series circuit being connected to one terminal of said A.C. power supply means, and further including a parallel circuit formed by a further capacitor and a further resistor, one terminal of said parallel circuit being connected to one terminal of said A.C. power supply means, and the other terminal of said parallel circuit being mediately connected to one terminal of said synchronous motor.

12. A drive arrangement according to claim 1, wherein said electronic circuit means include an output stage having a four-branch bridge circuit in the respective branches of which are disposed respectively four transistors, the windings of said synchronous motor being connected conductively and diagonally within said bridge circuit, and means for controlling conduction of said four transistors during periods of A.C. power supply means failure for opening and closing circuit paths in which said transistors are located, said transistors being opened and closed in pairs in opposite phase.

* * * * *